United States Patent [19]
Smith et al.

[11] Patent Number: 5,688,577
[45] Date of Patent: Nov. 18, 1997

[54] MULTI-DIRECTIONAL FRICTION MATERIALS

[75] Inventors: W. Novis Smith, Philadelphia, Pa.; Toby Burnham, Auburn, Ala.

[73] Assignee: R. K. Carbon Fibers, Inc., Philadelphia, Pa.

[21] Appl. No.: 508,105

[22] Filed: Jul. 27, 1995

[51] Int. Cl.⁶ .................................................. B32B 5/12
[52] U.S. Cl. ........................................ 428/113; 28/107
[58] Field of Search ........................ 428/113; 28/107

[56] References Cited

U.S. PATENT DOCUMENTS 4,790,052 12/1988 Olry .................................. 28/110
5,515,585 5/1996 Sheehan et al. ...................... 28/104

*Primary Examiner*—Christopher Raimund
*Attorney, Agent, or Firm*—John Lezdey

[57] ABSTRACT

The present invention provides a multi-directional friction material made from unidirectional carbonaceous and/or oxidized PAN based fibers. More particularly, the present invention teaches a multi-layered preform having at least three (3) unidirectional fabric layers oriented at different angles respective to each other to provide a superior heat dissipation properties in a friction material.

20 Claims, 2 Drawing Sheets

MULTI-DIRECTIONAL FRICTION MATERIALS

BACKGROUND OF THE INVENTION

1. Field of the Invention

The present invention relates generally to carbonaceous and/or oxidized polyacrylonitrile fibers for use in friction materials and methods of preparation therefor. More particularly, there is provided a preform made of these materials providing composite brake improved discs with mechanical properties which are useful in the nuclear, aerospace, aircraft, automotive and industrial fields. These composites are particularly useful as brake pads for aircraft, railroad and racing cars.

2. Description of the Prior Art

The interest in friction materials having non-asbestos reinforcing fibers carbon/carbon composites has rapidly increased over the past decade. These composites retain their strength, modulus, and mechanical properties up to higher temperatures than other materials. Generally, phenolic resins reinforced with carbon fibers have been used as starting materials for the preparation of carbon/carbon composites. The carbonization of these composites results in shrinkage and formation of cracks in the ultimate carbon matrix. The interaction between matrix and fiber may determine whether the resultant carbon/carbon composite will behave as a brittle, flaw sensitive material, or as a tough, thermal stress resistant composite. Therefore, the properties of the matrix as well as the fiber/matrix bonding are important factors in determining the fracture behavior and final mechanical properties of the composites.

The primary cause of disc failure in multi-disc brakes that are used in aircraft and railroad cars is thermal stress caused by thermal gradients. High heat input caused by the high deceleration requirements at high speeds and under great loads results in thermal stress which often causes failure of the brakes by dishing or cracking.

Friction elements such as automotive brake linings and disc pads, railway brake blocks and clutch facings can be made by bonding a friction material with a resin. Asbestos has been used as a friction material, either as a woven fabric or in fiber form. The asbestos is often bonded with a phenolic resin. When such asbestos type friction elements are subjected to severe brake or clutch operating conditions, the high temperatures produced tend to breakdown the element with resulting wear and/or loss in frictional properties.

In spite of this, friction elements for automotive and industrial application made hitherto from material other than asbestos have failed to match the performance of asbestos elements. Asbestos has conventionally been used as principal reinforcements for friction materials after being shaped and cured together with thermosetting resins and auxiliary reinforcements. Asbestos, however, is a carcinogenic substance which presents safety and health problems during both manufacture and use. Under these circumstances, demand has increased for non-asbestos fibrous friction materials. Friction materials generally are required to have friction coefficients of from 0.3 to 0.5 to ensure high wear resistance and mechanical strength at temperatures of about 500° C.

Conventional friction materials molded from a mixture of asbestos fibers, thermosetting resins and/or vulcanizable elastomers, particulate fillers and friction modifiers are not normally consolidated to achieve the theoretical densities of the mixtures. These mixtures usually contain proportions of voids, even when cured at temperatures of up to 160° C. and pressures of up to 3 tons per square inch. The presence of voids, especially when interconnected to produce a permeable structure, is desirable to produce materials with good resistance to "fade". That is, a reduction in the coefficient of friction occurs when the friction materials operate at high temperatures.

In recent years, carbon fibers and aramid fibers have come to be preferred over asbestos as fiber materials for use in friction materials such as automotive disc brake pads, clutch facings and the like. This is because the carbon and aramid fibers have superior anti-fade properties when compared to asbestos, while maintaining favorable wear properties.

In the field of multi-disc brakes such, as aircraft and high performance brake, the use of carbon/carbon brakes is now dominant. U.S. Pat. No. 3,650,357 to Nelson et al, which is herein incorporated by reference, discloses the making of an aircraft disc brake in which each disc of the brake stack is made from a carbon-based material having high specific heat, low density, low thermal expansion properties and good thermal stability over a wide range of load characteristics.

U.S. Pat. No. 4,490,201 to Leeds, which is herein incorporated by reference, discloses a method of making a carbon composite wherein a fabric comprised of oxidized or stabilized polyacrylonitrile ("PAN") based fibers is heat treated to totally carbonize the fabric and then coated with a resin. The carbon fabric is then further heat treated to thermally fuse the resin to the fabric.

U.S. Pat. No. 5,051,300 to Rousseau discloses a carbon/carbon composite for use as a high performance heat protector which contains an outer coating of SiC.

A variety of fibrous materials have been used as non-asbestos materials. For example, the known art uses preoxidized fibers produced by heat-treating acrylic PAN based fibers at from about 200° to 400° C. in air. However, the preoxidized fibers with a tensile strength of from about 1 to 3 g/d and a tensile modulus of elasticity of from about 50 to 150 g/d are not satisfactory as fibrous reinforcement materials when used in the arrangement taught by the prior art. In particular, the fibers are appreciably low in tensile modulus of elasticity as compared with asbestos. In addition, the weight of the fibers reduces at about 500° C., which is the temperature that should be withstood by friction materials. Furthermore, the fibers have a tendency to form cracks in the surface of the friction material due to effluent gas and shrinking in volume of the fibers without any compensating factors.

Fibrous brake preforms of preoxidized PAN fibers, are normally carbonized to 120° to 1600° before impregnation or CVD to make carbon/carbon composites. The use of carbon fibers derived from PAN as fibrous reinforcement materials has also been disclosed, for example, in U.S. Pat. No. 4,259,397. The carbon fibers are usually produced by calcining oxidized fibers at 1000° C. or higher in an inert gas to obtain fibers having a carbon content of at least 90 wt % and a bond nitrogen content of from about 1 to 8 wt %. These fiber types typically exhibit a tensile strength of at least about 13 g/d, a tensile modulus of elasticity of from about 1,400 to 1,800 g/d and an electric specific resistivity of no more than about 0.01 ohm-cm.

Carbon/carbon aircraft brakes and other related types of brakes are usually in the form of discs or tori. The preform for these brakes is usually made by textile procedures from continuous and staple preoxidized PAN fibers by conventional textile techniques such as needling, weaving, braiding and knitting. The resulting preform may range from 1 mm to 50 mm in thickness. The preform is infiltrated by resin, partially or fully carbonized and exposed to pyrolytic carbon by way of carbon vapor deposition (CVD). On the otherhand, the preform may be impregnated with resin and then treated further. The placement of fibers in the plane of the disc allows the heat generated by frictional forces on the surface of the disc to preferentially flow along the fiber axes and out to the edges of the disc where it can escape and be cooled by air. The fiber immediately perpendicular to the frictional surface of the disc permits heat flow away from frictional surface.

The disc preforms are built up layer by layer, usually comprising a mixture of layers of unidirectional fibers, woven fabrics and/or knitted fabrics. These layers are then needled together to secure them. Usually, carbon/carbon preforms are made from continuous preoxidized fibers (Panox) which are needled and formed into thick dense felts through various textile applications. These felts may then be subsequently partially or totally carbonized and then subjected to CVD to deposit carbon into the felt to fill up the spaces between the fibers. Pitch or phenolic resins can also be impregnated into these felts. In carbon/carbon aircraft brakes, the fibers in the plane of the disc help to carry heat formed while braking preferentially out to the edge of the disc where the heat can be more rapidly dissipated to the air. Heat that remains in the disc raises the temperature of the disc and the metal parts holding the carbon/carbon disc plates.

U.S. Pat. No. 4,490,201 to Leeds, which is herein incorporated by reference, teaches a method of making a carbon composite product in which a precursor substrate is constructed from interwoven oxidized, stabilized PAN fibers which have been coated with small amounts of binder. The precursor substrate is then exposed to pressure and temperature and carbonized to form a shaped substrate.

U.S. Pat. No. 4,659,624 to Yeager et al, which is incorporated herein by reference, discloses hybrid and unidirectional carbon/carbon fiber reinforced laminate composites. The composite includes plies of resin impregnated unidirectional carbon or graphite filament tape either alone or in combination with plies of resin impregnated woven carbon or graphite cloth materials.

U.S. Pat. No. 4,894,105 to Dyksterhouse et al, which is herein incorporated by reference, discloses a method for making a preimpregnated material having a particulate thermoplastic polymer. The polymer is exposed to heat and pressure to transform it into a substantially void-free fiber-reinforced composite article wherein the solid particles form the matrix phase.

Finally, an article of T.-H. Ko and K.-W. Hone entitled "Changes in Microstructure and Mechanical Properties of Stabilized Fiber Reinforced Phenolic Resin Composites During Pyrolysis to Carbon/Carbon Composites", which is enclosed and incorporated herein by reference, discloses carbon/carbon composites made by pyrolysis of phenol-formaldehyde resin and stabilized fiber.

Although the foregoing references exemplify the advancements which have been made in the art of friction materials, there nonetheless exists a continuing desire to provide improved fibrous reinforcing material both for composition brake pads and carbon/carbon aircraft brakes. The present invention is concerned with improved non-asbestos resin composites suitable for the preparation of friction elements for automotive and industrial use, and friction elements prepared therefrom. These friction elements may be employed in the form of a preform, a fiber, a paper, or the like.

It is therefore an object of the instant invention to provide improvements in the art of friction materials which employ nonasbestos materials.

It is a further object of the instant invention to provide a friction material having good thermal conductivity, high thermal stability, higher bond strength, improved coefficient of friction properties and lower shrinkage on heat treating.

It is still a further object of the instant invention to provide a carbon/carbon disc preform having extensive radially oriented fibers.

We have found that these and other objects of the instant invention can be attained using oxidized polyacrylonitrile based and/or carbonaceous fibers as described below.

SUMMARY OF THE INVENTION

The present invention, which is useful as a friction material, provides a multi-layered preform having unidirectional carbonaceous and/or oxidized PAN based fibers and a method of making therefor. The present invention preform includes at least three unidirectional fiber fabric layers. These layers are stacked one on top of another so that the longitudinal axis of each layer is oriented at an angle of x degrees respective to the longitudinal axis of any other layer, where x is a whole number greater than zero. The more layers that are added, the more the fibers will radiate from the center to the outer edge of the preform. The more the fibers radiate, the better the preform will dissipate heat and prevent heat build-up.

The advantages and objects of the instant invention will become evident by referring to the following description and claims.

DETAILED DESCRIPTION OF THE PREFERRED EMBODIMENTS

Figure 1:
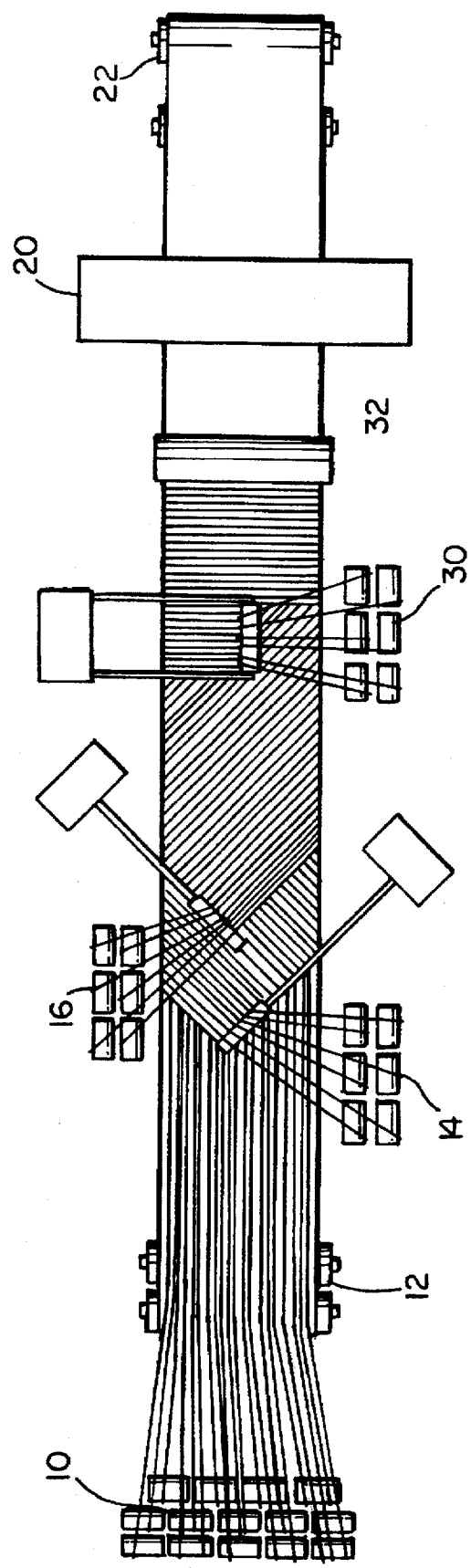
FIG. 1 shows the method of making the intermediate fabric of the present invention.
Figure 2:
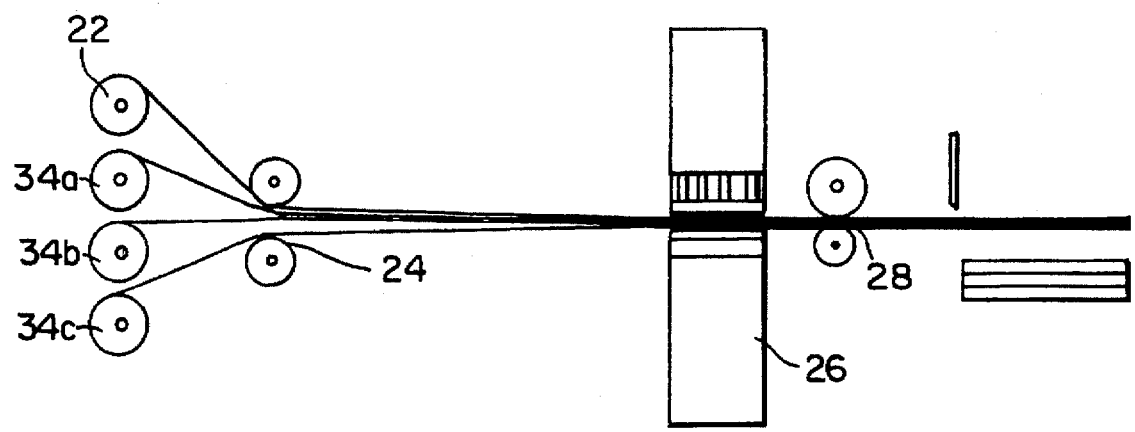
FIG. 2 shows the method of making the final preform pieces of the present invention using the intermediate fabric of FIG. 1.

FIGS. 1 and 2 illustrate the method of the present invention broken up into two steps. FIG. 1 shows Step I. There is a first plurality of spools and/or tows 10, which are placed immediately before a carrier fabric or conveyor belt 12. The tows 10 are fed through a roller system 40 and placed on the carrier fabric or conveyor belt 12. This first layer of fibers is spread to space the unidirectional fibers apart. The first layer advances down the line until it reaches a second plurality of spools and/or tows 14, which are set off the longitudinal axis of the line by some angle of x degrees. The second layer of fibers coming out of the second set of tows 14 is spread and spaced apart. The layered fabric then advances the line until it reaches a third plurality of spools and/or tow 16, which are set off of the longitudinal axis of the line by some angle of 2x degrees. The third layer of fibers is also spread and spaced apart. The layered fabric then advances to a fourth plurality of spools and/or tows 30, which are set off the longitudinal axis of the line by some angle of 3x degrees. The fourth layer of fibers spread and spaced apart. If desired, additional tows (not shown) may be set off further down the line at some angle of (x)(y) degrees. As the fibers leave each tow, they are simultaneously cut on the conveyor by a cutter (not shown) and readied for the next advancement.

After all the fibers have been layed up on one another, the line may optionally contain a top fabric roller 32 to place a top fabric on the layered fibers. The conveyor then proceeds to a needler 20, such as the one described in U.S. Pat. No. 4,902,561 to McCullough, Jr. et al, for needling together the layered fabric. Finally, the intermediate basic multi-layered fabric is taken up on cylinders or take-up rolls 22, which are ready for use in Step II.

FIG. 2 shows Step II used in the invention. A production line with Step II, FIG. 2 may be set up in series with the line shown in Step I, FIG. 1 or it may be separately set up for independent use. There are a plurality of cylinders or take up rolls 34a,b,c etc. containing the intermediate basic multi-layered fabric which are placed immediately before a carrier fabric or conveyor belt 24. The cylinders or take up rolls 22, 34, etc. are fed through a roller system 50 and placed on the carrier fabric or conveyor belt 24. Layers of multi-layered fabric advance down the line until they pass through a needler 26 much like described above. Finally, the needled layered fabric passes through a cutter 52 to cut out the multi-layered preforms which can be stacked or gathered up. Optionally, the preform pieces may be needled from the backside.

The carbonaceous fibers suitable for use in the instant invention may be prepared from fibers that are either oxidized PAN or partially carbonized PAN. The carbonaceous fibers are preferably those which are partially carbonized by heat treating under an inert atmosphere such as nitrogen, oxidized PAN based fibers at an effective temperature for an effective amount of time. Advantageously, the temperature should be from about 500° to 1000° C. in order to maintain a improved strength, sufficient elasticity to needle into suitable preform and have lower shrinkage on further heat treating. Usually the fibers are heated to about 600° C. for optimum results for preform formation. This is the minimum amount of curing needed to get improved strength and reduce shrinkage on subsequent heat treating. Preferably, the resulting carbonaceous fibers contain a carbon content in an amount of from about 60 to 88 wt %. The preoxidizing preform may be heat treated 500° to 1500°.

The resulting fibrous preform material has improved strength after carbonizing is resistant to melting and fusing and improved thermal after heat treatment than conventional preform.

The PAN based fibers used in the present invention are formed by conventional methods such as by melt or wet spinning a suitable solution of the precursor polymer material. The PAN based fibers which have a normal nominal diameter of from about 8 to 25 micrometers are collected as an assembly of a multiplicity of continuous filaments in tows. The PAN based fibers are then stabilized, for example, by oxidation or other conventional methods of stabilization. In one embodiment of the instant invention, the oxidized PAN based fibers are heat treated at a temperature of from about 500° to 1000° C. in an inert atmosphere for an effective period of time, preferably 5 to 20 minutes, to produce the partially carbonized carbonaceous fiber useful in the invention.

The carbonaceous fibers used in of the present invention are thermally stable and provide reinforcement at service temperatures over 200° C. without rapid breakage or degradation. Consequently, these fibers are non-melting and oxidation resistant. Moreover, the fibers used in the preform which is not heat treated further are thermally non-conductive or poorly conductive, which is important for friction materials so that the heat build-up is kept localized to, for example, the surface of a brake pad. Consequently, the heat will not thermally transfer to the metal surface mount of the pad, which would cause, for example, heat build-up in the more heat sensitive wheel components. Finally, the high bond strength fibers provide green strength to the brake or clutch pad when it is first made and cast prior to curing.

PAN based derived carbonaceous fibers contribute to the stabilization of the coefficient of friction of the friction material at high temperature. The carbonaceous fibers should be less than 15 mm in diameter in order to ensure a sufficient reinforcing effect. To ensure optimum reinforcing efficacy and even distribution of carbon fibers, they should be between 0.1 mm and 9.0 mm in length.

In the case of forming a fibrous preform which is treated with CVD to carbon/carbon, it has been found that the more fibers that are radially orientated, the more efficiently these fibers can conduct heat from the inside edge to the outer edge of the disc and the more reinforcing strength these radial fibers contribute when braking forces are exerted on the disc. In general, the placement of fibers to increase the effective amount of radial fibers in a disc or torus preform is desirable whether it is for a clutch plate or aircraft brake. Therefore, it would be desirable to have fibers laid down in as many orientations as possible. The prior art uses no more than two (2) different orientations, usually, 0° and 90°. The present invention contemplates a structure containing at least three (3) different orientations.

The present invention describes the formation and composition of needled preforms for use in making components, particularly, aircraft brakes. The resulting component which utilizes this preform approach is also included. This same approach may be used for other composite materials which utilize continuous fibers laid 0°, 45°, 90°, 135° and 180°, for example, in combinations, usually in an alternating manner.

It has been found that a simple efficient way to place more fibers in a radial manner is to prepare a unidirectional fabric from oxidized PAN based fiber tows where the tows are spread as thin as possible without showing any gaps or spaces between the fibers. This band of fibers is needled sufficiently so as to hold it together and needled at a 45° angle to each other to provide some z or perpendicular direction fibers. This is accomplished as shown in FIG. 1. This can also be accomplished in one step as shown in FIG. 2. The basic fabric is the 0°/45° fabric which also serves as the 90°/135° fabric when rotated 90°. This 0°/45° fabric is the building block to form thicker felts by stacking on each layer and needling in the appropriate manner. The orientation of each successive layer is such as to add 45° to the previous layer in order to maintain the repeating sequence of 0°–45°–90°–135° through out the stack of unidirectional layers of fibers. Although the preferred fiber is oxidized PAN, carbonaceous fibers of up to 80% carbon can also be used providing the elongation is over 2.5% so that needling damage due to fiber breakage is not excessive.

In another embodiment, all of the layers are needled in sequentially 0°, 45°, 90° and 135° a 4 or 5 layer base fabric.

Variations of this processing approach utilizing the 0°/45° unidirectional fabric layers, which contain two plies, are also possible, in which combinations of 0°/22.5° and 0°/45° unidirectional fiber fabric are alternated. Also, the basic building block fabrics can also be built up into three or four layers and then rotated, stacked and needled. Other variations are possible in this process. Basically, the minimum parameters of the present invention require at least three (3) fabric layers which are oriented so that each layer is at some angle, for example, x degrees, from a different layer.

The preform disclosed herein has unidirectional fiber layers which have a mixture of orientations of their axes which include more than the conventional 0° and 90° orientation in the multilayer stack. The preform can be derived from oxidized PAN based fibers or partially carbonized oxidized PAN based fibers with a carbon content ranging from 60% to 88%. Other friction applications can also utilize the stack as described, such as using with phenolic or pitch resin impregnation. This same type of stacking or layering of unidirectional fibers can be used for structural applications utilizing auxiliary fibers such as glass, p-aramid (Kevlar) or hybrid mixtures and then impregnating with a resin such as epoxy, vinyl ester, or unsaturated polyester.

In a multi-layered preform for use as a friction material having carbonaceous and/or oxidized polyacrylonitrile based fibers, the improvement is as follows. At least three fabric layers have fibers which are stacked one on top of another so that the longitudinal axis of each layer is oriented at an angle of x degrees respective to the longitudinal axis of any other layer beneath it, where x is a whole number greater than zero. The fibers of each layer are substantially symmetrical and spaced radially emanating from the center of the preform. The layers are then needled together to form the multi-layered preform.

Preferably, the angle of x degrees is selected from the group consisting of 22.5°, 45.0°, 67.5° and 90.0°. The preform is built up of unidirectional fiber layers which have their axes orientated in alternating 0°, 45°, 90° and 135° to each other. Similar to a X superimposed upon a + to produce a more even distribution of unidirectional fibers in the plane of the disc, the same process can be used to achieve 0°, 22.5°, 45°, 67.5°, 90°, 112.5°, 135°, 157.5° and 180° alternating lay ups of the unidirectional fiber layers. The fibers advantageously have a carbon content of from about 60 to 88 wt %. We have also found that the preform can optionally comprise carbonaceous fibers derived from the oxidized PAN based fibers. The total thickness of the preform is preferably between 1 and 50 mm, with each individual layer accounting for about 1 to 15 mm in thickness.

We have also found that the preform can optionally comprise nonwoven fabric layers interspersed between the unidirectional fiber layers. However, it is preferable that the nonwoven fabric layers weigh no more than about 25% of the total weight of the multi-layered preform.

Furthermore, it may be preferable to impregnate the preform with a resin. Advantageously, the impregnated preform can be carbonized the subjected to CVD so as to deposit carbon within the preform to fill in any spaces between the fibers.

The unidirectional fiber layers are preferably chosen from woven, knitted and/or braided fabrics.

In addition the to the multi-layered preform disclosed herein, the present invention also teaches a multi-weave preform.

In a multi-weaved preform for use as a friction material having unidirectional oxidized polyacrylonitrile based fibers, the improvement comprises at least three fabric layers having said fibers which are interweaved amongst each other so that the longitudinal axis of each layer is oriented at an angle of x degrees respective to the longitudinal axis of any other layer, where x is a whole number greater than zero. The fibers of each layer are substantially symmetrically spaced and radially emanating from the center of the preform. The layers are needled together to form the preform.

Finally, as illustrated in FIGS. 1 and 2, the present invention provides a method of making the multi-layered preform discussed above. The present invention teaches a method of making a multi-layered preform for use as a friction material or preform having unidirectional carbonaceous and/or oxidized polyacrylonitrile based fibers. The said method comprises the steps of:

(a) feeding a first tow 10 of fibers onto a first carrier fabric 12 or conveyor belt;

(b) spreading a group of one or more fiber tows until the fibers lay flat and evenly cover the surface underneath;

(c) feeding a second group of parallel tows 14 of the fibers onto the carrier fabric or conveyor belt; the second tow being oriented at an angle of x degrees respective to the first tow, wherein x is a whole number greater than zero;

(d) spreading the second group of fibrous tows until the fibers lay flat and cover the surface below;

(e) feeding a third tow 16 of the fibers onto the carrier fabric or conveyor belt; the third tow being oriented at an angle of x degrees respective to the second tow, wherein x is a whole number greater than zero;

(f) spreading the third group of fibrous tow bands until the fibers are spread and lay flat covering the surface below;

(g) needling together the layers with a needler 20 to form a multi-layered composite;

(h) cutting the multi-layered composite into intermediate segments 22;

(i) feeding a plurality of the multi-layered composite segments 34a,b,c onto a second carrier fabric or conveyor belt 24;

(j) needling together the composite segments with a needler 26 to form a multi-layered preform; and (k) cutting the multi-layered preform with a cutter 28.

Advantageously, one may feed additional tows of fibers for example 30, which are orientated at an angle of x degrees respective to any of the previous tows where x is a whole number greater than zero. The fibrous tow bands lay flat and are spaced to evenly cover the surface below. Preferably, the fibers have a carbon content of from about 60 to 88 wt %. The method also contemplates the advantageous use of carbonaceous fibers derived from oxidized PAN based fibers.

Optionally, the method may further comprise feeding a top fabric 32 onto the carrier fabric or conveyor belt 12 when the intermediate fabric 22 is finished.

Figure 3:
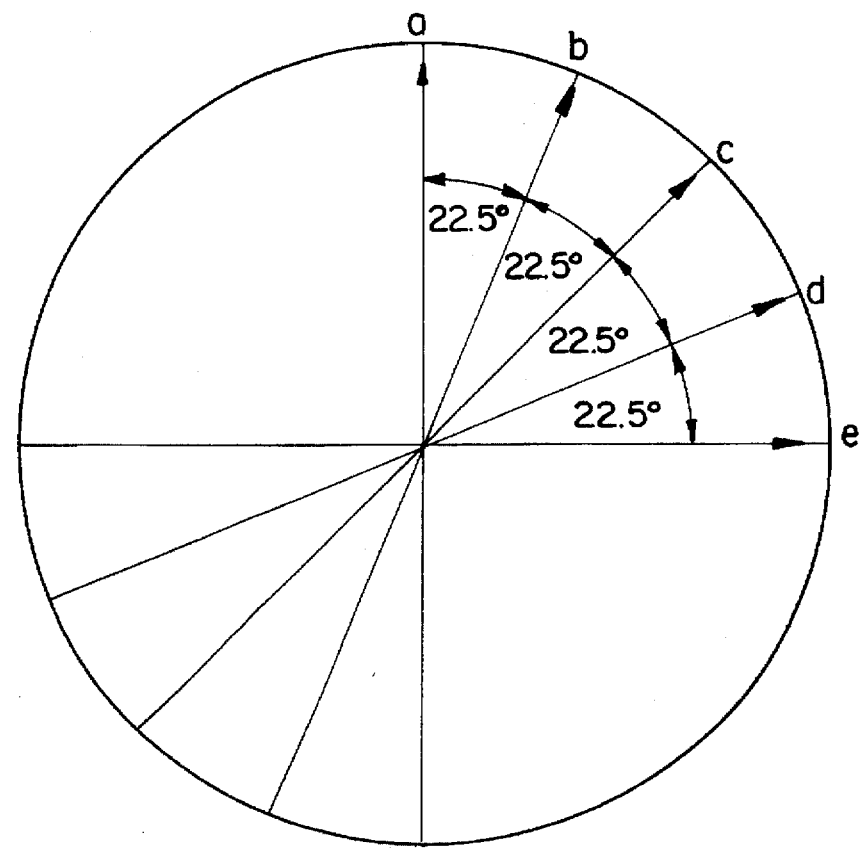
FIG. 3 shows a magnified view of the cross plies of a particular embodiment of the present invention.

Finally, FIG. 3 illustrates a magnification of an ideal composite of the present invention. As can be seen, each fabric line is symmetrical, balanced and evenly spaced. Tow a is 0°. Tow b is 22.5° respective to Tow a. Tow c is 22.5° respective to Tow b as well as 45.0° respective to Tow a. Tow d is 22.5° respective to Tow c as well as 67.5° respective to Tow a. Finally, Tow e is 22.5° respective to Tow d as well as 90° respective to Tow a.

This maximizes the radial properties to dissipate heat and results in a superior friction material preform. The number of tows and the size of the angle may be varied so long as there are at least three (3) flat layers of fibrous tow bands.

EXAMPLE

The following example illustrates the preparation of a carbon/carbon composite suitable for use as automotive brakes. A preform was made according to the preferred method for orientating the layers of oxidized PAN fiber tows (Panox made by preoxidizing Courtaulds SAF precursor 320K filament tow). Each tow band layer consisted of five 320K filament tow bands spread to about 24 inches in total width. The unidirectional five tow band layers were layered down with the angles between them as follows: 0°, 45°, 90° which also produced fibers approximately emanating from the preform center at angles of 135°, 180°, 225°, 270° and 315°. An initial needled staple fiber fabric carrier for the unidirectional layers was used although this is optional. The five layer stack of layers was needled heavily together. Approximately five layers of this multi-layer needled fabric were stacked up one 5-ply layer at a time and needled together to form a preform material about 1.5 inches thick with a fiber volume of over 46%. A 12"×12" piece of this was carbonized up to 1500° C. and then subjected to CVD processing. The preform material performed perfectly and achieved the planned density about 1.76. This compares favorably with other preforms. The friction testing on the dynamometer showed satisfactory braking performance and excellent strength.

Although the invention has been described with reference to certain preferred embodiments, it is understood that the present disclosure has been made only by way of example and that many variations, modifications and changes in the details of construction may be resorted to without departing from the spirit and scope of the broad principles delineated in this patent application. Hence, it is intended that the preferred embodiments and all of such variations and modifications be included within the scope and spirit of the instant invention, as defined by the following claims:

What is claimed is:

1. In an improved multi-layered preform for use as a friction material having carbonaceous and/or oxidized polyacrylonitrile based fibers; the improvement comprising at least three stacked unidirectional fabric layers; each layer having said fibers unidirectional so that a longitudinal axis of each layer is oriented at an angle of x degrees respective to the longitudinal axis of any other layer; wherein x is a whole number greater than zero; said angle of x degrees being selected from the group consisting of 22.5, 45.0, 67.5, 90.5, 112.5, 135.0, 157.5 and 180.0; said fibers of each layer being substantially symmetrically spaced; and said layers being needled together to form said multi-layered preform.

2. The multi-layered preform as recited in claim 1, wherein said fibers have a carbon content of from about 60 to 88 wt %.

3. The multi-layered preform as recited in claim 1, further comprising carbonaceous fibers derived from said oxidized polyacrylonitrile based fibers.

4. The multi-layered preform as recited in claim 1, wherein said preform is from about 1 to 50 mm in thickness.

5. The multi-layered preform as recited in claim 3, wherein said carbonaceous fibers are derived by heat treating said oxidized polyacrylonitrile fibers in an inert atmosphere at a temperature of up to about 1000° C.

6. The multi-layered preform as recited in claim 1, wherein said preform is impregnated with a resin.

7. The multi-layered preform as recited in claim 6, which has been carbonized and treated with a chemical vapor deposition so as to deposit carbon within said preform to fill in spaces between said fibers.

8. The multi-layered preform as recited in claim 6, wherein said resin is selected from the group consisting of a phenolic resin and a pitch resin.

9. The multi-layered preform as recited in claim 1, including auxiliary fibers and a resin.

10. The multi-layered preform as recited in claim 9, wherein said auxiliary fibers are selected from the group consisting of a glass, a p-aramid and mixtures thereof.

11. The multi-layered preform as recited in claim 9, wherein said resin is selected from the group consisting of an epoxy, a vinyl ester and an unsaturated polyester.

12. A method of making a multi-layered preform for use as a friction material having unidirectional carbonaceous and/or oxidized polyacrylonitrile based fibers; said method comprising the steps of:

(a) feeding a first group of fibrous tows of said fibers onto a first carrier fabric or a first conveyor belt;

(b) spreading said first group of fibrous tows until said fibers lay flat and cover said carrier fabric or said conveyor belt;

(c) feeding a second group of fibrous tows of said fibers onto said carrier fabric or said conveyor belt; said second group of fibrous tows being oriented at an angle of x degrees respective to said first group of fibrous tows, wherein x is a whole number greater than zero;

(d) spreading said second group of fibrous tows until said fibers lay flat and cover a layer below;

(e) feeding a third group of fibrous tows of said fibers onto said carrier fabric or said conveyor belt; said third group of fibrous tows being oriented at an angle of x degrees respective to said second group of fibrous tows, wherein x is a whole number greater than zero;

(f) spreading said third group of fibrous tows until said fibers lay flat and cover a layer below;

(g) feeding a preselected number of additional groups of fibrous tows of said fibers onto said carrier fabric or said conveyor belt; said additional groups of fibrous tows being oriented at an angle of x degrees respective to any one of said previous groups of fibrous tows, wherein x is a whole number greater than zero;

(h) spreading each additional group of fibrous tows until said fibers lay flat and cover a layer below;

(i) needling together said fibrous tow layers to form a multi-layered composite;

(j) cutting said multi-layered composite into segments;

(k) feeding a plurality of said multi-layered composite segments onto a second carrier fabric or a second conveyor belt;

(l) needling together said composite segments to form a multi-layered preform; and (m) cutting said preform into predetermined sizes.

13. The method as recited in claim 12, said fibers having a carbon content of from about 60 to 88 wt %.

14. The method as recited in claim 12, further comprising carbonaceous fibers derived from said oxidized polyacrylonitrile based fibers.

15. The method as recited in claim 12, including the steps of impregnating said preform with a resin and then carbonizing said resin.

16. The process of claim 15, including the step of depositing carbon vapor on said preform to fill in spaces between said fibers.

17. In an improved multi-layered preform for use as a friction material having carbonaceous and/or oxidized polyacrylonitrile based fibers; the improvement comprising at least three stacked unidirectional fabric layers and a plurality of nonwoven fabric layers interspersed between said unidirectional fabric layers; said nonwoven fabric layers comprising up to about 25 wt % of a total weight of said multi-layered preform; wherein a longitudinal axis of each layer is oriented at an angle of x degrees respective to the longitudinal axis of any other layer; wherein x is a whole number greater than zero; said fibers of each layer being substantially symmetrically spaced; and said layers being needled together to form said multi-layered preform.

18. The multi-layered preform as recited in claim 17, wherein said fibers have a carbon content of from about 60 to 88 wt %.

19. A method of making a multi-layered preform for use as a friction material having unidirectional carbonaceous and/or oxidized polyacrylonitrile based fibers; said method comprising the steps of:

(a) feeding a first group of fibrous tows of said fibers onto a first carrier fabric or a first conveyor belt;

(b) spreading said first group of fibrous tows until said fibers lay flat and cover said carrier fabric or said conveyor belt;

(c) feeding a second group of fibrous tows of said fibers onto said carrier fabric or said conveyor belt; said second group of fibrous tows being oriented at an angle of x degrees respective to said first group of fibrous tows, wherein x is a whole number greater than zero;

(d) spreading said second group of fibrous tows until said fibers lay flat and cover a layer below;

(e) feeding a third group of fibrous tows of said fibers onto said carrier fabric or said conveyor belt; said third group of fibrous tows being oriented at an angle of x degrees respective to said second group of fibrous tows, wherein x is a whole number greater than zero;

(f) spreading said third group of fibrous tows until said fibers lay flat and cover a layer below;

(g) feeding a preselected number of additional groups of fibrous tows of said fibers onto said carrier fabric or said conveyor belt; said additional groups of fibrous tows being oriented at an angle of x degrees respective to any one of said previous groups of fibrous tows, wherein x is a whole number greater than zero;

(h) spreading each additional groups of fibrous tows until said fibers lay flat and cover a layer below;

(i) feeding a top fabric onto said carrier fabric or said conveyor belt;

(j) needling together said fibrous tow layers to form a multi-layered composite;

(k) cutting said multi-layered composite into segments;

(l) feeding a plurality of said multi-layered composite segments onto a second carrier fabric or a second conveyor belt;

(m) needling together said composite segments to form a multi-layered preform; and (n) cutting said preform into predetermined sizes.

20. The method as recited in claim 12, wherein said fibers are spaced apart from one another about 0.1 to 10.0 mm in distance.

* * * * *